United States Patent [19]

Tanaka

[11] Patent Number: 4,701,651
[45] Date of Patent: Oct. 20, 1987

[54] MOTOR UNIT

[75] Inventor: Katsuhiko Tanaka, Yamato, Japan

[73] Assignee: Nippon Seiko Kabushiki Kaisha, Tokyo, Japan

[21] Appl. No.: 793,267

[22] Filed: Oct. 31, 1985

[30] Foreign Application Priority Data

Dec. 7, 1984 [JP] Japan .................... 59-184893[U]

[51] Int. Cl.$^4$ ............................................. H02K 5/16
[52] U.S. Cl. ..................... 310/90; 384/102; 384/446; 384/517
[58] Field of Search .......... 310/90, 90.5, 268, 40 MM; 384/101, 102, 446, 517

[56] References Cited

U.S. PATENT DOCUMENTS

| | | | |
|---|---|---|---|
| 2,663,977 | 12/1953 | Gerard | 384/101 |
| 3,107,946 | 10/1963 | Drake | 310/90 UX |
| 3,302,048 | 1/1967 | Gray | 310/90 |
| 4,363,984 | 12/1982 | Torii | 310/90 |
| 4,394,091 | 7/1983 | Klomp | 384/101 |
| 4,443,043 | 4/1984 | Yamaguchi | 310/90 |
| 4,523,800 | 6/1985 | Yamashita | 310/90 |
| 4,545,741 | 10/1985 | Tomioka | 384/101 |
| 4,570,093 | 2/1986 | Morii | 310/268 |

FOREIGN PATENT DOCUMENTS

| | | | |
|---|---|---|---|
| 1532972 | 7/1967 | France | 384/102 |
| 0097920 | 6/1982 | Japan . | |
| 0200722 | 12/1982 | Japan . | |
| 0454096 | 1/1973 | U.S.S.R. | 384/102 |

Primary Examiner—R. Skudy
Attorney, Agent, or Firm—Shapiro and Shapiro

[57] ABSTRACT

A motor unit has a stationary member, a rotatable member rotatable relative to the stationary member, a stator provided on the stationary member, a rotor provided on the rotatable member, and at least two bearings disposed between the stationary member and the rotatable member. The rotor and stator are constructed so that the rotor is electromagnetically attracted toward the stator during the energization of the motor. One of the bearings is a ball bearing having an outer race with preload applied by the electromagnetic attraction of the rotor and an inner race formed on the rotatable member, and the other bearing is a hydrodynamic pressure type radial bearing.

6 Claims, 2 Drawing Figures

MOTOR UNIT

BACKGROUND OF THE INVENTION

1. Field of the Invention

This invention relates to a motor unit used in the rotary portion of a precision rotation instrument such as a magnetic disk or Video tape Recorder.

2. Description of the Prior Art

The heretofore known motor unit of this type is of a structure in which, as disclosed, for example, in Japanese Laid-open Patent Application No. 200722/1982, a rotatable member is supported by two ball bearings. In such a support structure using ball bearings, it is necessary to use the motor unit with a preload applied to the bearings by preloading means such as predetermined position preloading means and constant preloading means.

However, the preloading means is structurally complicated and therefore requires much time and labor in assembly, thus resulting in high cost. Also, the bearing is of a structure in which outer and inner races are formed as individual members, and this has led to a disadvantage in that if a clearance fit is provided between the shaft and the inner race, rotation accuracy is reduced. Conversely, if an interference fit is provided between the shaft and the inner race, assembly becomes more difficult.

It is also known to use a hydrodynamic pressure type fluid bearing instead of said ball bearing (see Japanese Laid-open Patent Application No. 97920/1982), but where a fluid bearing is used, it is necessary to provide a thrust bearing at the end of the shaft and, the structure becomes complicated.

SUMMARY OF THE INVENTION

It is an object of the present invention to solve the above-noted disadvantages and problems peculiar to the prior art and to provide a motor unit in which the structure around the bearing is simplified to facilitate the assembly of the motor unit and which is generally compact.

The motor unit of the present invention is of a construction in which bearings for supporting a rotatable member comprise two bearings, i.e., a ball bearing and a dynamic pressure type radial bearing moreover, said bearings do not use any special inner race member; rather, the shaft directly provides an inner race. At the same time, a preload is applied to the ball bearing by a magnetic attraction.

Thus, in the rotating portion of the motor unit, the features of the ball bearing and the hydrodynamic pressure type radial bearing are collectively displayed and assembly becomes easy and compactness can be achieved.

More specifically, the motor unit of the present invention is of a construction in which a rotatable member has rotatable support portions which are disposed axially at suitable intervals and which are supported by a ball bearing and a hydrodynamic pressure type radial bearing, respectively. The ball bearing does not use any special inner race member but directly uses a shaft as the inner race and a preload is applied by a magnetic attraction acting between the rotor and stator of the motor. Therefore, a sufficient moment load capability can be maintained and improvement of the rotational performance can be achieved, with the effects of the ball bearing and the hydrodynamic pressure type radial bearing being displayed in a combined manner. Since no special preloading means is used, the number of parts is reduced and assembly is easy. Also, since the shaft is directly used as the inner race, the outer diameter of the unit becomes smaller, and this is advantageous in respect of performance, cost, compactness and other points.

DESCRIPTION OF THE PREFERRED EMBODIMENTS

Figure 1:
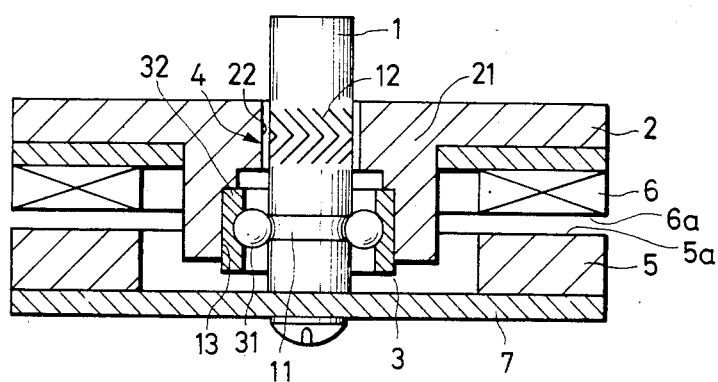
FIG. 1 is a cross-sectional view of the relevant portions of a motor unit according to an embodiment of the present invention.

The motor unit of the present invention will hereinafter be described with respect to two embodiments thereof shown in FIGS. 1 and 2. Reference numeral 1 designates a shaft, reference numeral 2 denotes a housing, reference numeral 3 designates a ball bearing, reference numeral 4 denotes a hydrodynamic pressure type radial bearing, reference numeral 5 designates a motor rotor, and reference numeral 6 denotes a motor stator. The rotor and the stator have surfaces 5a and 6a, respectively, extending radially of shaft 1 and opposed to each other so as to axially attract the rotor to the stator by an electromagnetic force during the rotation or energization of the motor.

The shaft 1 is formed with a groove 11 which constitutes the inner race of the ball bearing and a hydrodynamic pressure producing groove 12 on the outer peripheral surface at a suitable axial interval.

The groove 12 is necessary for the production of the hydrodynamic pressure of the hydrodynamic type radial bearing 4. An end of the shaft 1 which is adjacent to the groove 11 is integrally connected to the support member 7 of the rotor 5.

In the embodiment of FIG. 1, the housing 2 holding the stator 6 has a centrally bored portion 21 having an inner peripheral surface 22 which supports a radial load. The inner peripheral surface 22 is opposed to and cooperates with the dynamic pressure producing groove 12 of the shaft 1. The centrally bored portion 21 has an inner peripheral step portion 13 holding an outer race 32 which completes the ball bearing between the housing 2 and the groove 11 of the shaft 1 through balls 31. The outer race 32 is fixedly fitted to the inner peripheral step portion 13. A necessary preload is applied to the ball bearing 3 by an axial attraction acting between the rotor and stator of the motor during energization or rotation of the motor.

Figure 2:
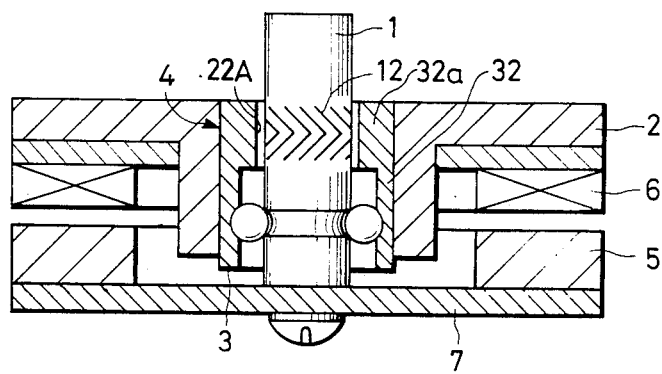
FIG. 2 is a view similar to FIG. 1 but showing another embodiment of the present invention.

FIG. 2 shows another embodiment of the bearing portion in said motor unit. In this embodiment, an inner peripheral surface 22A for supporting radial load (which corresponds to the inner surface 22 formed the central portion of the housing in FIG. 1) is formed on a portion 32a extended axially from an outer race 32 of the ball bearing 3. For this purpose, a small-diametered inner peripheral surface of the extended portion 32a of the outer race 32 is opposed to the hydrodynamic pressure producing groove 12 of the shaft 1. In other respects the embodiment of FIG. 2 is the same as the embodiment of FIG. 1.

The above-described embodiments merely show typical examples of the present invention, and the materials, the construction details, etc. are not limited to those shown. For example, the pattern of the hydrodynamic pressure producing groove of the hydrodynamic pressure type radial bearing portion and the type of lubricant used in the bearing portion (fluid such as gas or oil, or grease) are not especially restricted. Also, the bearing portions of the ball bearing and the hydrodynamic pressure type radial bearing may sometimes be provided with a well-known seal as required. As examples of the use of the motor unit of the present invention, there are the case of shaft rotation and the case of housing rotation. Of course, the motor unit may be of the vertical type of the horizontal type.

I claim:

1. A motor unit comprising:
 a cylindrical shaft having an outer peripheral surface;
 a member having an inner peripheral surface surrounding the outer peripheral surface of said shaft along an axial portion of said shaft
 a hydrodynamic pressure type radial bearing formed between the outer peripheral surface of said shaft and the inner peripheral surface of said member;
 a ball bearing including an inner race groove formed on the outer peripheral surface of said shaft, an outer race secured to the inner peripheral surface of said member and opposed to said inner race groove, and a plurality of balls disposed between said inner race groove and said outer race; and
 electromagnetic driving means for causing relative rotation between said shaft and said member and for generating an attractive magnetic force which urges said shaft and said member in opposite axial directions to apply axial preload to the ball bearing.

2. A motor unit in accordance with claim 1, wherein said outer race of said ball bearing has an axial extension having an inner peripheral surface which constitutes an outer bearing surface of said hydrodynamic bearing.

3. A motor unit in accordance with claim 1, wherein said electromagnetic driving means comprises a stator supported on one of said shaft and said member and a rotor supported on the other of said shaft and said member.

4. A motor unit in accordance with claim 3, wherein said stator and said rotor have radially extending portions facing one another and axially attracted to each other by said magnetic force when said electromagnetic means is energized.

5. A motor unit comprising:
 a cylindrical rotational shaft having an outer peripheral surface;
 a stationary member having a radially extended portion and an axially extended sleeve portion surrounding an axial portion of said shaft;
 a hydrodynamic pressure type bearing formed between the outer peripheral surface of said shaft and an inner peripheral surface of said stationary member;
 a ball bearing provided between the outer peripheral surface of said shaft and the inner peripheral surface of said stationary member axially distant from said hydrodynamic pressure type bearing, said ball bearing including an inner race groove formed on the outer peripheral surface of said shaft, an outer race element secured to an inner peripheral surface of the axially extended sleeve portion of said stationary member, and a plurality of balls disposed between said inner race groove and said outer race element; and
 electromagnetic driving means including a stator secured to the radially extending portion of said stationary member and a rotor mounted to said shaft, said stator and said rotor having respective radially extended portions facing each other such that said rotor and said stator are attracted axially to each other when said electromagnetic driving means is energized, thereby applying axial preload to said ball bearing.

6. A motor unit in accordance with claim 5, wherein said outer race of said ball bearing has an axial extension having an inner peripheral surface which constitutes an outer bearing surface of said hydrodynamic bearing.

* * * * *